(12) United States Patent
Lu et al.

(10) Patent No.: US 11,419,105 B2
(45) Date of Patent: Aug. 16, 2022

(54) METHODS, SYSTEMS AND UNITS OF DISTRIBUTED BASE STATION SYSTEM FOR HANDLING DOWNLINK COMMUNICATION

(71) Applicant: Telefonaktiebolaget LM Ericsson (publ), Stockholm (SE)

(72) Inventors: Chenguang Lu, Sollentuna (SE); Miguel Berg, Sollentuna (SE); Yezi Huang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

(21) Appl. No.: 16/769,504

(22) PCT Filed: Dec. 27, 2017

(86) PCT No.: PCT/SE2017/051351
§ 371 (c)(1),
(2) Date: Jun. 3, 2020

(87) PCT Pub. No.: WO2019/132743
PCT Pub. Date: Jul. 4, 2019

(65) Prior Publication Data
US 2020/0389880 A1 Dec. 10, 2020

(51) Int. Cl.
*H04W 72/04* (2009.01)
*H04B 7/0452* (2017.01)
(Continued)

(52) U.S. Cl.
CPC ........ *H04W 72/044* (2013.01); *H04B 7/0452* (2013.01); *H04B 7/0456* (2013.01); *H04W 72/082* (2013.01); *H04W 88/085* (2013.01)

(58) Field of Classification Search
CPC .............. H04W 72/044; H04W 72/082; H04B 7/0452; H04B 7/0456; H04B 7/0617; H04B 7/0695; H04B 7/024
See application file for complete search history.

(56) References Cited

U.S. PATENT DOCUMENTS

2015/0124688 A1* 5/2015 Xu ...................... H04L 27/2607
370/312
2017/0170880 A1* 6/2017 Wu ...................... H04B 7/0634
(Continued)

OTHER PUBLICATIONS

PCT International Search Report for International application No. PCT/SE2017/051351—dated Sep. 26, 2018.
(Continued)

*Primary Examiner* — Habte Mered
(74) *Attorney, Agent, or Firm* — Baker Botts, LLP

(57) ABSTRACT

A method is disclosed performed by an RRU (120) of a distributed base station system (100) of a wireless communication network, the distributed base station system (100) further comprises a BBU (110) connected to the RRU, the RRU (120) being connected to a plurality of antennas (121, 122, 123) through which the RRU transmits user-layer signals to a plurality of UEs (161, 162, 163). The method comprises sending information related to received uplink signals to the BBU so that the BBU can obtain a first part of precoding coefficients to be used for precoding digital user-layer signals. The method further comprises obtaining a second part of the precoding coefficients and receiving, from the BBU, the digital user-layer signals precoded using the first part of the precoding coefficients. The method further comprises precoding the received digital user-layer signals precoded with the first part of the precoding coefficients also with the second part of the precoding coefficients, and transmitting the user-layer signals to the plurality of UEs (161, 162, 163) via the plurality of antennas (121, 122, 123).

17 Claims, 6 Drawing Sheets

(51) Int. Cl.
*H04B 7/0456* (2017.01)
*H04W 72/08* (2009.01)
*H04W 88/08* (2009.01)

(56) References Cited

U.S. PATENT DOCUMENTS

| | | | |
|---|---|---|---|
| 2018/0138957 A1* | 5/2018 | Wang | H04W 72/04 |
| 2018/0167236 A1* | 6/2018 | Li | H04L 25/0204 |
| 2021/0119674 A1* | 4/2021 | Yuan | H04L 5/0053 |
| 2021/0226721 A1* | 7/2021 | Gao | H04L 25/0204 |

OTHER PUBLICATIONS

3GPP TR 38.801 v2.0.0; Technical Report; 3rd Generation Partnership Project; Technical Specification Group Radio Access Network; Study on New Radio Access Technology; Radio Access Architecture and Interfaces (Release 14)—Mar. 2017.
PCT Written Opinion of the International Searching Authority for International application No. PCT/SE2017/051351—dated Sep. 26, 2018.

* cited by examiner

METHODS, SYSTEMS AND UNITS OF DISTRIBUTED BASE STATION SYSTEM FOR HANDLING DOWNLINK COMMUNICATION

PRIORITY

This nonprovisional application is a U.S. National Stage Filing under 35 U.S.C. § 371 of International Patent Application Serial No. PCT/SE2017/051351 filed Dec. 27, 2017 and entitled "METHODS, SYSTEMS AND UNITS OF A DISTRIBUTED BASE STATION SYSTEM FOR HANDLING DOWNLINK COMMUNICATION" which is hereby incorporated by reference in its entirety.

TECHNICAL FIELD

The present disclosure relates generally to methods, systems and units of a distributed base station system for handling downlink communication. More specifically, the present disclosure relates to a Remote Radio Unit, RRU, and a method performed by such an RRU of a distributed base station system of a wireless communication network. The distributed base station system further comprises a Base Band Unit, BBU, connected to the RRU, and the RRU is connected to a plurality of antennas through which the RRU wirelessly communicates with at least one UE. The present disclosure further relates to corresponding BBU systems and methods performed by such BBU systems. The present disclosure further relates to computer programs and carriers corresponding to the above methods, BBU systems and RRUs.

BACKGROUND

In a centralized radio access network, C-RAN, also called a distributed base station system, radio access network, RAN, processing is conducted by two separate units: a remote radio unit, RRU, and a base band unit, BBU. The BBU is connected to the RRU via a fronthaul link. The RRU is connected to one or more antennas through which the RRU wirelessly communicates with at least one user equipment, UE. The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission, CoMP, to increase the spectrum efficiency and network capacity, as well as baseband processing, whereas the RRUs perform radio frequency, RF, processing and transmission/reception of the RF processed signals. Such a split of base station functionality between BBU and RRU is called a PHY-RF split.

Originally, the RRU was designed to reduce the cable loss of the coaxial cables between an antenna tower top where the actual antennas are situated and the bottom of the antenna tower where the base station functionality is hosted. Therefore, before 5th Generation of mobile communication, 5G, i.e. at 4G, e.g. Long Term Evolution, LTE, the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output, MIMO, in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N>>K. e.g., N is 64, 128 or 256 while K is 8 or 16. As shown, the number of antennas are quite large. To support such massive MIMO solutions, the required fronthaul link capacity needs to be increased in proportion to the increase of number of antennas, when using the current PHY-RF split between functionality of BBU and RRU. This will dramatically drive up the fronthaul link costs.

To address this, new split options regarding fronthaul functionality have been discussed in 3GPP, see 3GPP TR 38.801, V14.0.0: "Study on new radio access technology: Radio access architecture and interfaces", published March 2017. Some of the discussed split options (option 7-1, 7-3), as well as the current PHY-RF split (option 8) are shown in FIG. 1. A discussed split option is an Intra PHY split option called option 7-1 in FIG. 1, in which Inverse Fast Fourier Transformation, IFFT, and Cyclic Prefix, CP, addition is performed in the RRU, as well as the digital to RF conversion. The 7-1 split option increases fronthaul efficiency and hereby reduces the need for fronthaul capacity due to reduced frequency redundancy and by adapting the fronthaul bit rate to traffic load, which is possible when IFFT is performed in the RRU instead of in the BBU. However, there is still a problem that there is one bit stream per antenna transmitted over the front haul, and for massive MIMO there will still be very much data needed to be sent over the fronthaul link.

In order to achieve a split between functionality of the RRU and the BBU so that the RRU becomes cost-efficient and also so that the fronthaul connection capacity can be kept on a reasonable level, the split option 7-3 has been suggested. Here the BBU encodes the data of MIMO user layers and sends coded data per user layer to the RRU. The RRU then performs modulation, resource mapping and precoding of the modulated signals, in addition to the functionality of option 7-1. This lowers the amount of bit streams to be sent over the fronthaul link down to the number of MIMO user layers and consequently reduces the necessary capacity of the fronthaul link, as well as reduces the needed number of bits per sample.

In the 7-3 option, precoding coefficients are usually calculated in the BBU and sent to the RRU via the fronthaul link, and the RRU performs the precoding based on the precoding coefficients. A reason for calculating the precoding coefficients in the BBU instead of in the RRU is that the coefficient calculation requires intensive computational operations and it is a request to make the RRU as simple as possible for cost efficiency reasons. However, the amount of precoding coefficients $N_p$ is proportional to the number of antennas N and the number of user layers K. For massive MIMO, the number of antennas N is large and therefore the amount of precoding coefficients $N_p$ increases dramatically. Consequently, a lot of the fronthaul capacity is taken for transporting precoding coefficients at the expense of transporting actual signals. When assuming 12 subcarriers, i.e. one resource block, RB, in LTE, per precoding coefficient, 64 antennas and 16 bits for each coefficient, the number of bits per subcarrier per layer becomes 16*64/12=85.3 bits, which is more than 10 times larger than 8 bits of 256 Quadrature Amplitude Modulation, QAM, for data. If the precoder needs to update every 14 symbols, which means every 1 ms in LTE, the number of bits for the precoding coefficients per subcarrier per layer per symbol that needs to be sent from the BBU to the precoder of the RRU over the fronthaul link becomes 16*64/12/14=6.1 bits. Regarding 256 QAM data symbols, 43% of the fronthaul link traffic will then be precoding coefficients. This will increase further when the antenna size increases, e.g. to 128 and 256 etc. Therefore, with massive MIMO, the fronthaul link overhead for transporting the precoding coefficients is very large and can dominate the fronthaul link traffic for large configurations. If instead letting the RRU determine the precoding coefficients itself, the RRU will become computationally complex, resulting in a non-cost efficient distributed base station system.

In "Low RF-Complexity Millimeter-Wave Beamspace-MIMO Systems by Beam Selection," by Amadori et al, published in IEEE Transactions on Communications, vol. 63, no. 6, pp. 2212-2223, June 2015, there is one method referred to as direction selection, DS or beam selection, BS, which is able to reduce the fronthaul link overhead due to the sending of precoding coefficients from the BBU to the RRU. This method is in the following referred to as the DS method to facilitate the denotation. It is discussed in a hybrid beamforming scenario. The idea can be used to reduce the number of precoding coefficients through fronthaul link. In the DS method, the RRU generates a fixed number of directive beams towards many directions covering the service area. The fixed number of beams are formed with a set of fixed beamforming coefficients. For example, applying Discrete Fourier Transform, DFT, coefficients on the signals towards the antenna elements can generate the same number of beams as the number of antenna elements. To simplify the denotation, the directive beams are called "the directions". The BBU selects a subset of the directions according to the channel information and calculate the coefficients corresponding to the subset of the directions. Since the number of selected directions are smaller than the number of antennas, the number of the coefficients for the selected directions is reduced compared to the original case. The method is based on the fact that the propagation concentrates to some dominant directions, from the main reflections around. However, the DS method needs to select much more directions than the number of user layers and therefore the reduction of the number of beamforming coefficients is limited, and consequently, also the reduction of fronthaul overhead due to sending of fronthaul coefficients.

Further, the 7-3 option of performing the precoding at the RRU limits the coordination possibilities of multiple RRUs connected to centralized BBUs. For example, the 7-3 option cannot support the BBU to jointly process user-layer signals directed to multiple RRUs in order to achieve mutual benefits for user-layer signals, as the BBU only works on the coded bits. Instead, the user-layer signals of different RRUs are processed independently of each other. The 7-3 option also limits the system scalability for larger MIMO support. To upgrade to a larger MIMO system, the existing RRU has to be replaced by a new RRU with more antennas. It would be good if this can be achieved by instead stacking multiple RRUs together to scale up the number of antennas. For example, two RRUs, RRU1 and RRU2, each having 64 antennas, where both RRUs are connected to the same BBU, form a 128-antenna MIMO system. In this case, if RRU 1 and RRU 2 are not collocated, i.e. deployed at two neighboring sites, then this can form a distributed MIMO system with 128 antennas. Using option 7-3, each RRU can only operate on its own for e.g. interference pre-mitigation, e.g. using Interference Rejection Combining (IRC)-based methods. In this case, the degrees of freedom in the system are not increased, i.e. the number of MIMO layers cannot be increased. On the other hand, it can distribute the MIMO layers between the RRUs. Comparing to a system using option 8 or 7-1, the 7-3 option cannot achieve the full MIMO gain when using multiple RRUs. Going back to the option 8 and 7-1, there the signals of the RRUs can be coordinated as the precoding is performed in the BBU. Then, for example, the interferences at the UEs caused by the transmissions from different RRUs can be pre-cancelled in BBU. Full degrees of freedom can be kept and therefore more layers can be transmitted by using more RRUs. However, as mentioned before the number of fronthaul streams needed to be sent over the fronthaul is too high for the 7-1 and 8 options in massive MIMO.

As shown, there is a need for an improved solution for handling transmission of downlink data in a distributed base station system comprising a BBU and a RRU. Also, there is a need for such a solution that more efficiently uses fronthaul link capacity and still achieves full MIMO gain of the air interface performance in a distributed base station system where one BBU is connected with a plurality of RRUs while enabling user-layer signal coordination in the BBU.

SUMMARY

It is an object of the invention to address at least some of the problems and issues outlined above. It is possible to achieve these objects and others by using a method and an apparatus as defined in the attached independent claims.

According to one aspect, a method is provided performed by a RRU of a distributed base station system of a wireless communication network. The distributed base station system further comprises a BBU connected to the RRU. The RRU is connected to a plurality of antennas through which the RRU transmits user-layer signals to a plurality of UEs, the user-layer signals being transmitted using same time-frequency resource. The method comprises receiving uplink signals from the plurality of UEs, sending information related to the received uplink signals to the BBU so that the BBU can obtain a first part of precoding coefficients to be used for precoding digital user-layer signals in frequency domain, and obtaining a second part of the precoding coefficients. The method further comprises receiving, from the BBU, the digital user-layer signals precoded using the first part of the precoding coefficients, precoding the received digital user-layer signals with the second part of the precoding coefficients and converting the digital user-layer signals precoded with the first and the second part of the precoding coefficients to analog user-layer signals. Thereafter, the analog user-layer signals are transmitted to the plurality of UEs via the plurality of antennas.

According to another aspect, a method is provided performed by a BBU system of a wireless communication network. The wireless communication network comprises a distributed base station system having a BBU and at least one RRU connected to the BBU. The method comprises receiving, from the at least one RRU, information related to uplink signals received by the at least one RRU from a plurality of UEs wirelessly connected to the at least one RRU, the method further comprises obtaining, based on the received information, a first part of precoding coefficients for precoding digital user-layer signals, which precoded user-layer signals are to be sent by the at least one RRU to the plurality of UEs, the first part of the precoding coefficients being determined so as to pre-mitigate interference between the user layer signals sent to the plurality of UEs, the precoding coefficients comprising the first part and a second part. The method further comprises precoding the digital user-layer signals, using only the first part of the precoding coefficients, and sending the precoded digital user-layer signals to the at least one RRU for further precoding with the second part of the precoding coefficients before the user-layer signals are sent to the UEs.

According to another aspect, an RRU is provided operable in a distributed base station system of a wireless communication network. The distributed base station system further comprises a BBU connected to the RRU. The RRU is connected to a plurality of antennas through which the RRU is arranged to transmit user-layer signals to a plurality of UEs using same time-frequency resource. The RRU comprises a processing circuitry and a memory. The memory contains instructions executable by said processing circuitry, whereby the RRU is operative for receiving uplink signals from the plurality of UEs, sending information related to the received uplink signals to the BBU so that the BBU can obtain a first part of precoding coefficients to be used for precoding digital user-layer signals in frequency domain, and obtaining a second part of the precoding coefficients. The RRU is further operative for receiving, from the BBU, the digital user-layer signals precoded using the first part of the precoding coefficients, and precoding the received digital user-layer signals with the second part of the precoding coefficients. The RRU is further operative for converting the digital user-layer signals precoded with the first and the second part of the precoding coefficients to analog user-layer signals, and transmitting the analog user-layer signals to the plurality of UEs via the plurality of antennas.

According to another aspect, a BBU system is provided operable in a wireless communication network, the wireless communication network comprising a distributed base station system having a BBU and at least one RRU connected to the BBU. The BBU system comprises a processing circuitry and a memory. The memory contains instructions executable by said processing circuitry, whereby the BBU system is operative for receiving, from the at least one RRU, information related to uplink signals received by the at least one RRU from a plurality of UEs wirelessly connected to the at least one RRU. The BBU system is further operative for obtaining, based on the received information, a first part of precoding coefficients for precoding digital user-layer signals, which precoded user-layer signals are to be sent by the at least one RRU to the plurality of UEs, the first part of the precoding coefficients being determined so as to pre-mitigate interference between the user layer signals sent to the plurality of UEs, the precoding coefficients comprising the first part and a second part. The BBU system is further operative for precoding the digital user-layer signals, using only the first part of the precoding coefficients, and for sending the precoded digital user-layer signals to the at least one RRU for further precoding with the second part of the precoding coefficients before the user-layer signals are sent to the UEs.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

According to an embodiment, in order to achieve a more efficient split of RAN processing functionality between one or more RRUs and a BBU of a distributed base station system, when the one or more RRUs each has a plurality of antennas, the present invention suggests to decompose the precoding into two parts, a first and a second part. The first part of the precoding using a first part of precoding coefficients is performed by the BBU. The first part of the precoding is performed in order to pre-mitigate interference between the user layer signals. The second part of the precoding using a second part of precoding coefficients is on the other hand performed by the one or more RRUs. The second part of the precoding may be performed in order to spatially concentrate the energy of each user-layer towards its UE. When digital user-layer signals are to be sent from the BBU to the UEs via the one or more RRUs, the digital user-layer signals are first precoded using the first part of the precoding coefficients. Then the digital user-layer signals precoded with the first part of precoding coefficients are sent to the at least one RRU. The precoded digital user layer-signals received at the one or more RRUs are then precoded once again using the second part of the precoding coefficients before they are transmitted from the plurality of antennas of the one or more RRUs to their respective UE. Such an embodiment efficiently uses the fronthaul connection between the RRU and the BBU as a limited number of user-layer signals are transmitted over the fronthaul compared to option 7-1 and 8. Also, it is possible to mitigate interference between signals sent from different RRUs as the first part of precoding, in order to mitigate interference, is performed by the BBU so the BBU can coordinate the interference mitigation for the two or more RRUs, when they send user-layer signals at least partly to the same UEs. This is not possible for prior art option 7-3.

Figure 1:
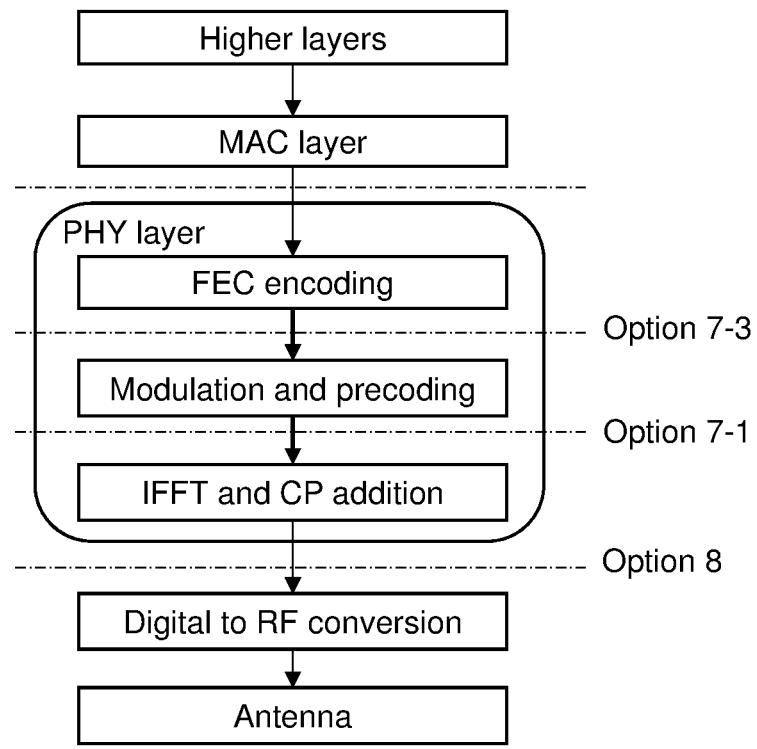
FIG. 1 is a flow chart illustrating different known functional splits of distributed base station systems.
Figure 2:
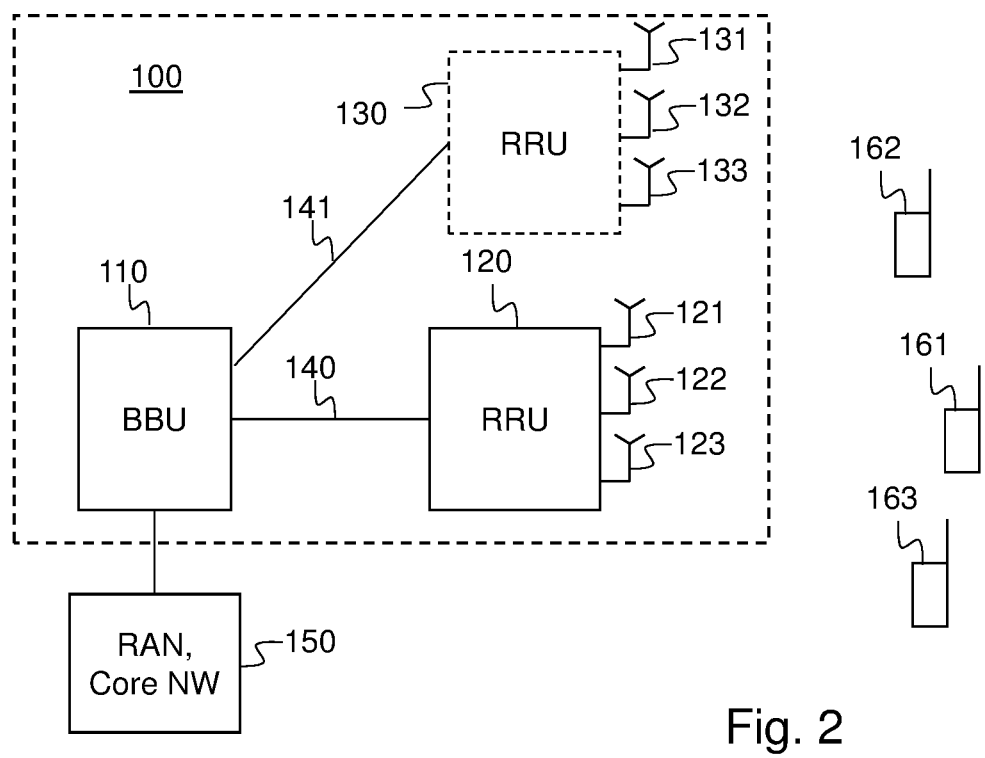
FIG. 2 is a block diagram illustrating a communication scenario in which the present invention may be used.

FIG. 2 illustrates a wireless communication network in which the present invention may be used. The wireless communication network comprises a distributed base station system 100, which in turn comprises a BBU 110 and a first RRU 120. The BBU 110 has connections to other base station nodes or other RAN nodes and further to a core network (symbolized with 150 in FIG. 2) so that the distributed base station system can communicate to other nodes of the communication network. The BBU 110 is connected with the first RRU via a fronthaul link 140. The fronthaul link 140 may be any kind of connection, such as a dedicated wireline or wireless connection or a connection via a network, as long as the connection fulfils fronthaul requirements, e.g. in capacity and latency. The first RRU 120 further has a plurality of antennas 121, 122, 123 through which wireless signals are communicated towards and from one or more UEs 161, 162, 163. The wireless signals comprises data to be communicated from or to the UEs 161, 162, 163. The distributed base station system 100 may further comprise a second RRU 130. The BBU 110 is connected with the second RRU 130 via another fronthaul link 141. The another fronthaul link 141 may be any kind of connection, such as a dedicated wireline or wireless connection or a connection via a network, as long as the connection fulfils fronthaul requirements, e.g. in capacity and latency. The another fronthaul link 141 may or may not share the same connection as the fronthaul link 140. The second RRU 130 further has a plurality of antennas 131, 132, 133 through which wireless signals are communicated towards and from one or more of the UEs 161, 162, 163. The BBU 110 and the first and second RRU 120 comprise RAN functionality for handling the data and signals to be communicated between the first and second RRU 120, 130 and the UEs 161, 162, 163. The RAN functionality is distributed between the BBU 110 and the RRU(s) 120, 130 as will be described further down in this disclosure.

Figure 3:
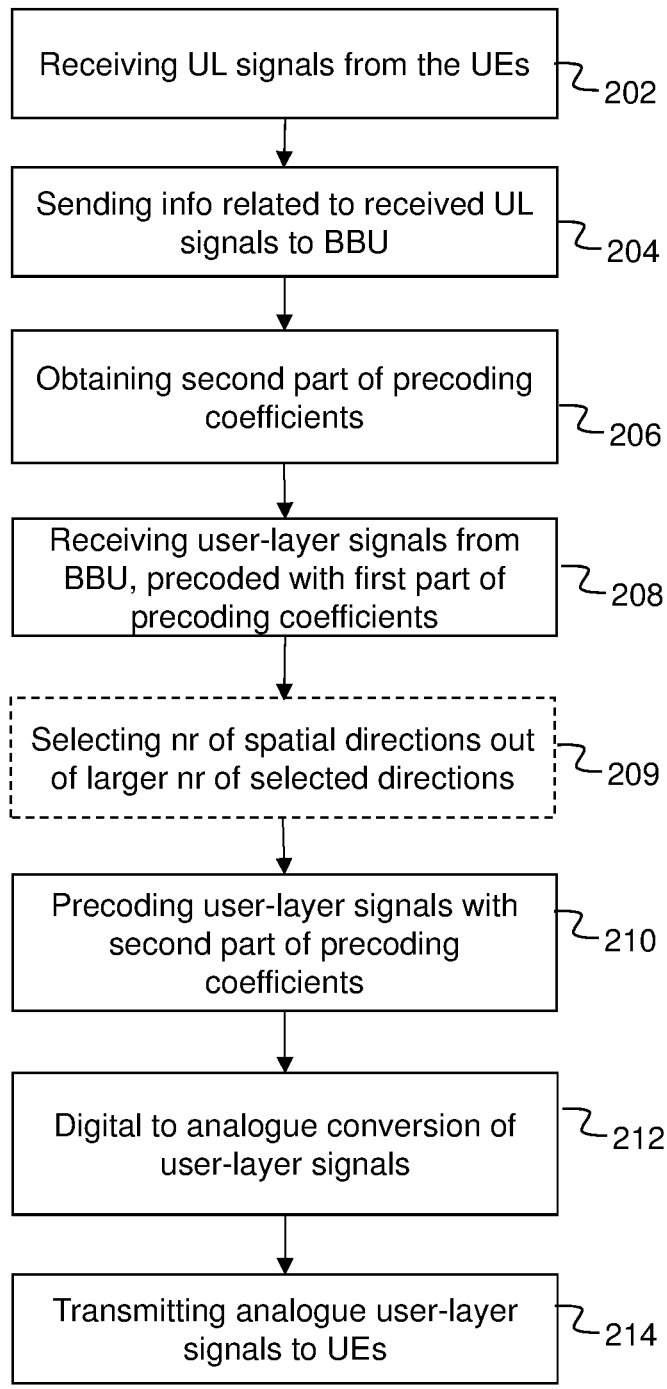
FIG. 3 is a flow chart illustrating a method performed by a RRU, according to possible embodiments of the invention.

FIG. 3, in conjunction with FIG. 2, describes a method performed by a RRU 120 of a distributed base station system 100 of a wireless communication network. The distributed base station system 100 further comprises a BBU 110 connected to the RRU. The RRU 120 is connected to a plurality of antennas 121, 122, 123 through which the RRU 120 transmits user-layer signals to a plurality of UEs 161, 162, 163, the user-layer signals being transmitted using same time-frequency resource. The method comprises receiving 202 uplink signals from the plurality of UEs, sending 204 information related to the received uplink signals to the BBU 110 so that the BBU can obtain a first part of precoding coefficients to be used for precoding digital user-layer signals in frequency domain, and obtaining 206 a second part of the precoding coefficients. The method further comprises receiving 208, from the BBU 110, the digital user-layer signals precoded using the first part of the precoding coefficients, precoding 210 the received digital user-layer signals with the second part of the precoding coefficients and converting 212 the digital user-layer signals precoded with the first and the second part of the precoding coefficients to analog user-layer signals. Thereafter, the analog user-layer signals are transmitted 214 to the plurality of UEs 161, 162, 163 via the plurality of antennas 121, 122, 123. The analog user-layer signals are also converted into the radio frequency domain before being transmitted wirelessly to the plurality of UEs.

Hereby, the user layer signals are partly precoded at the BBU and partly at the RRU. As part of the precoding is performed at the BBU and part at the RRU, calculation complexity can be lowered at the RRU, making the RRU less complex and thus more cost-efficient compared to having all calculation performed at the RRU. Further, in case the BBU is connected to more than one RRU, the BBU can coordinate the precoding of user-layer signals to the more than one RRUs, as part of the precoding is performed at the BBU.

The uplink signals may be uplink reference signals such as Sounding Reference Signals, SRS, De-Modulation Reference Signal, DMRS or any other signal that may be defined for the purpose of assisting downlink channel estimation. An uplink channel may be estimated from the uplink signals and a downlink channel estimate may be determined from the estimated uplink channel, for example by removing frontend difference from the estimated uplink channel and the UE transmit power. Alternatively, the downlink channel estimate may be determined directly from the received uplink signals. Alternatively, the downlink channel can be estimated by the UE on downlink signals received by the UE from the RRU and measured on. The downlink channel estimate is then sent by the UE to the RRU, as uplink signals. The invention is applicable to any kind of wireless communication technology, such as technologies based on Time Division Multiple Access, TDMA, Frequency Division Multiple Access, FDMA, Code Division Multiple Access, CDMA, Orthogonal Frequency-division Multiple Access, OFDMA, Time Division Duplex, TDD, or Frequency Division Duplex, FDD. The invention is especially advantageous in TDD-based technologies, as in TDD the downlink and uplink channels are reciprocal over the air. In TDD, any difference between uplink and downlink channel is mainly from the radio frontend difference in uplink and downlink, which difference can be calibrated out. The information related to the received uplink signals, sent to the BBU, could be the actual uplink signals or an uplink channel estimate determined by the RRU from the uplink signals or a downlink channel estimate determined by the RRU from the uplink signals. The second part of the precoding coefficients can be obtained by being received from the BBU when a BBU system has determined the second part of the precoding coefficients, or the second part of the precoding coefficients can be obtained by being determined by the RRU from the received uplink signals. According to an embodiment, the BBU is informed of what beamforming coefficients the RRU will use for precoding, i.e. which coefficients that are "the second part of the coefficients", and consequently, which part of the precoding coefficients the BBU is to use for precoding, i.e. which coefficients that are "the first part of the coefficients". According to another embodiment, the BBU is informed of what precoding scheme the RRU uses, e.g. from configuration. This may be set at configuration so that the BBU is informed from the configuration which precoding scheme the RRU will use for determining its precoding coefficients.

"Pre-coding" signifies a spatial coding defining how the downlink signals of different user layers are to be distributed from the individual antennas 121, 122, 123 of an RRU 120 when transmitted from the antennas towards the UEs 161, 162, 163. For multiple user layers, the transmit signal of each antenna is a linear combination of the signal of different user layers, in which the signal of each user layer is multiplied with a precoding coefficient and then the multiplication results of all signal of user layers are added together. In a special case of only one user layer, the transmitted signal of each antenna is the signal of the user layer multiplied with a precoding coefficient. The precoding works in the signal domain, to achieve the array gain, spatial diversity gain, spatial multiplexing gain and interference mitigation spatially. This is not to be mixed with encoding and decoding of data, which deals with e.g. adding redundancy in the bit domain in order to make the transmitted data more robust to interference, or to compress data in order to be able to send less bits than the original data. User-layer signals refer to the transmitted signals mapped on different Multiple Input Multiple Output, MIMO, layers for single user MIMO or multi-user MIMO. In LTE and NR, they are also scheduled in a frequency-time grid, in addition to MIMO layers in spatial domain. In this disclosure, the user-layer may be equivalent to MIMO layer. In MIMO transmission, the multipath radio channel is separated spatially to multiple MIMO layers leveraging on the multiple antennas at the transmitter side and/or the receiver side, such that each MIMO layer can carry independent data streams with mitigated interferences between MIMO layers. This is usually referred to as spatial multiplexing gain of MIMO. For example, in downlink, DL, each user-layer signal carries an independent data stream to a specific user. The user-layer signals from different MIMO layers are precoded to mitigate the interferences. The precoded user-layers signals are transmitted out from the antennas as analog signals. The digital user-layer signals are frequency-domain signals. The analog user-layer signals are time-domain signals. Converting the precoded digital user-layer signals to precoded analog user-layer signals signifies transforming the signals from frequency domain to time domain, e.g. using an Inverse Fast Fourier Transform, IFFT.

According to an embodiment, the obtained 206 second part of the precoding coefficients is determined so that when transmitting 214 the analog user-layer signals, the transmitted energy of each user-layer signal is spatially concentrated towards its corresponding UE 161, 162, 163. This determining of the second part of the precoding coefficients may be performed by the RRU, or the determining may be performed by the BBU system, wherein the second part of the coefficients is received by the RRU from the BBU system. Determining the precoding coefficients for spatially concentrating the transmitted energy is less complex than determining the precoding coefficients for mitigating interference between user-layer signals at the UEs, which precoding here is performed in the BBU. By performing the less complex coefficients determination for spatially concentrating transmitted energy at the RRU and the more complex coefficients determination for mitigation of interference at the BBU, the RRU can be made less complex and therefore more cost-efficient.

According to another embodiment, the second part of the precoding coefficients is determined by determining maximum ratio transmission, MRT, coefficients for each user-layer signal based on the uplink signals. The RRU may determine the MRT coefficients based on the uplink signals directly, alternatively, the RRU may determine a downlink channel estimate from the uplink signals and determine the MRT coefficients from the downlink channel estimate. An MRT-based method results in better air interface performance compared to a direction selection or beam selection method.

According to another embodiment, the method further comprises selecting 209, based on the received uplink signals and per digital user-layer signal, a number of spatial directions out of a larger number of possible spatial directions, the selected number of spatial directions being fewer than the plurality of antennas but larger than or equal to the number of digital user-layer signals, and wherein the precoding 210 is performed for the selected number of spatial directions. The selection is done per digital user-layer signal. I.e. a separate selection of spatial directions is made per user-layer signal, based on the uplink signals. Further, the precoding is also performed based on the received uplink signals. Hereby, each digital user-layer signal is concentrated toward its UE by precoding through the selected number of the spatial directions. Further, the complexity of the precoding step is lowered as the number of spatial direction are fewer than the number of antennas and fewer than the number of possible spatial directions. Spatial directions here mean directive beams from the respective antennas of the RRU towards different directions. The possible spatial direction may be predefined directions. The possible spatial directions are predefined for example by performing a spatial digital Fourier transform, DFT, operation. The selection is made based on the received uplink signals. The uplink signals are used to determine a downlink channel estimate, as describes earlier, and the downlink channel estimate describes the channel gain in the different possible spatial directions. The selection is selecting a subset out of these predefined possible spatial directions. For an N-antenna system, e.g. a uniform linear array (ULA), an N-point DFT operation effectively forms N directive beams towards different directions simultaneously. Each input port of the DFT represents one of such directive beams. If a signal is transmitted on one input port of the DFT, other input points may have zeros, the signal will be transformed to all antennas and results in that the signal is transmitted towards the direction which the input point corresponds to. Basically, the spatial DFT transforms the channel into a direction domain. If a plane array is used, a two-dimensional DFT can be used. To make a selection of directions per user-layer signal outperforms the DS method that makes one selection for all user-layers. The DS method will not be as precise, and consequently not achieve as high signal level at reception at the UEs as this method as the selected directions are not specially adapted to each user-layer signal, i.e. to each UE. Further, and due to this reason, the DS method needs to select more directions in order not to achieve too low signal level at the UEs, and more directions means that more data has to be sent over the fronthaul link.

According to a variant of this embodiment, the selected number of spatial directions have higher channel gain or better signal quality according to the received uplink signals, than non-selected spatial directions of the possible spatial directions. This outperforms the DS method that makes one common selection regarding all user-layers. The signal quality may be measured as SNR or SINR.

Figure 4:
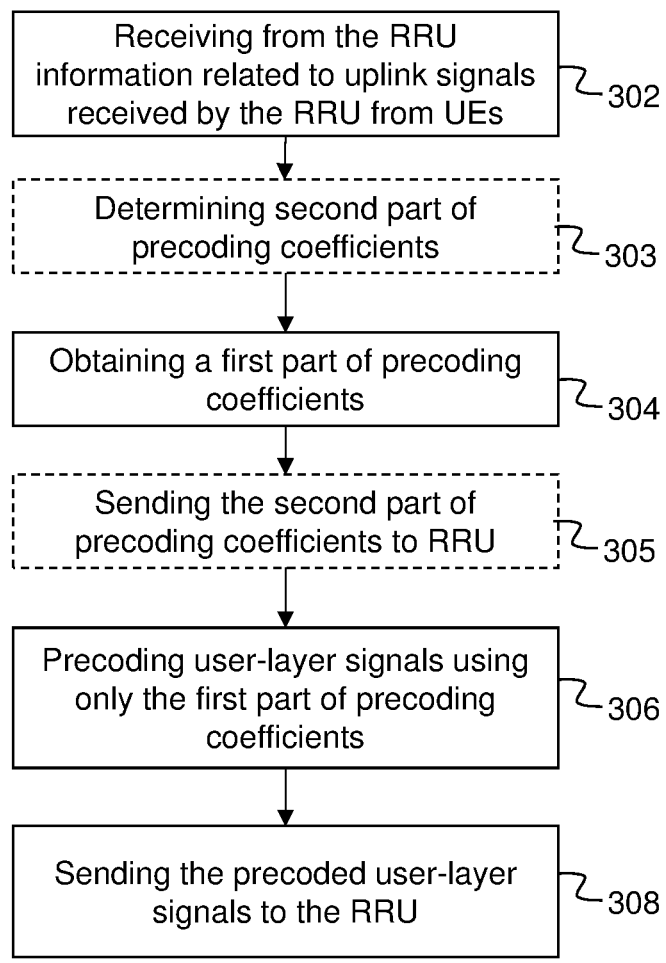
FIG. 4 is a flow chart illustrating a method performed by a BBU system, according to possible embodiments of the invention.

FIG. 4, in conjunction with FIG. 2, describes a method performed by a BBU system of a wireless communication network. The wireless communication network comprises a distributed base station system 100 having a BBU 110 and at least one RRU 120, 130 connected to the BBU. The method comprises receiving 302, from the at least one RRU 120, 130, information related to uplink signals received by the at least one RRU from a plurality of UEs 161, 162, 163 wirelessly connected to the at least one RRU 120, 130, and obtaining 304, based on the received information, a first part of precoding coefficients for precoding digital user-layer signals, which precoded user-layer signals are to be sent by the at least one RRU 120, 130 to the plurality of UEs 161, 162, 163, the first part of the precoding coefficients being determined so as to pre-mitigate interference between the user layer signals sent to the plurality of UEs, the precoding coefficients comprising the first part and a second part. The method further comprises precoding 306 the digital user-layer signals, using only the first part of the precoding coefficients, and sending 308 the precoded digital user-layer signals to the at least one RRU 120, 130 for further precoding with the second part of the precoding coefficients before the user-layer signals are sent to the UEs 161, 162, 163.

The BBU system of the wireless communication network that performs the method may be the BBU 110. Alternatively, the BBU system may be any other network node of the communication network, such as a node further away from the UE, e.g. another network element in the RAN or close to the RAN or another RAN node. In this alternative, the BBU 110 receives from the RRU 120, the information related to uplink signals received by the RRU 120 from the UEs, and communicates the information to the other network node for performing the determination 404, where after the other network node sends the determined second part of precoding coefficients back to the BBU 110 for further distribution to the RRU 120. Alternatively, the BBU system may be a group of network nodes, wherein functionality for performing the method are spread out over different physical, or virtual, nodes of the network. The latter may be called a "cloud-solution".

The precoded digital user-layer signals sent to the at least one RRU 120, 130 is to be precoded once again at the RRU(s), this time using the second part of the precoding coefficients. The second part of the precoding coefficients may be determined so that the energy transmitted from the plurality of antennas is spatially concentrated in directions towards the plurality of UEs. For example, the precoded user-layer signals transmitted from different antennas may be received coherently at the UEs, such that the received energy is enhanced for each user-layer signal. The second part of the precoding coefficients may be determined by the RRU(s), or determined by the BBU and sent to the RRU(s). The number of precoded digital user-layer signals may be at least as many as the number of the user layers. According to a preferred embodiment, the number of precoded digital user-layer signals is the same as the number of user layers. The method is especially advantageous when more than one RRU is connected to the BBU, as the BBU receives information related to uplink signals from the more than one RRUs and can calculate precoding coefficients in order to pre-mitigate interference between the user layer signals for all RRUs, and use the calculated precoding coefficients for precoding the user-layer signals to the RRUs. Hereby, a coordination can be achieved for the precoding in terms of mitigating interference for signals from different RRUs and thereby achieve full MIMO gain with the number of antennas of all RRUs connected. For example, two 64-antenna RRUs together with one BBU forms a 128-antenna MIMO system.

According to an embodiment, the method further comprises determining 303, based on the received information, the second part of the precoding coefficients, and sending 305 the determined second part of the precoding coefficients to the at least one RRU 120, 130.

According to another embodiment, the at least one RRU 120, 130 comprises a first RRU 120 and a second RRU 130. Further, for at least one of the plurality of UEs 161, 162, 163, the precoded digital user-layer signal of that UE is sent 308 to the first RRU 120 as well as to the second RRU 130. Hereby, the at least one UE can receive its user-layer signal from the first RRU 120 as well as from the second RRU 130, receiving diversity from the antennas 121, 122, 123 of the first RRU 120 as well as from the antennas 131, 132, 133 of the second RRU 130. As a result, a more robust sending of signals is received compared to only using one RRU per UE. Also, as the precoding coefficients for pre-mitigating interference for user layers signals are calculated and this part of the precoding is performed at the BBU 110, the precoding can be coordinated on order to mitigate interference between wireless signals sent form both the first and the second RRU.

Figure 5:
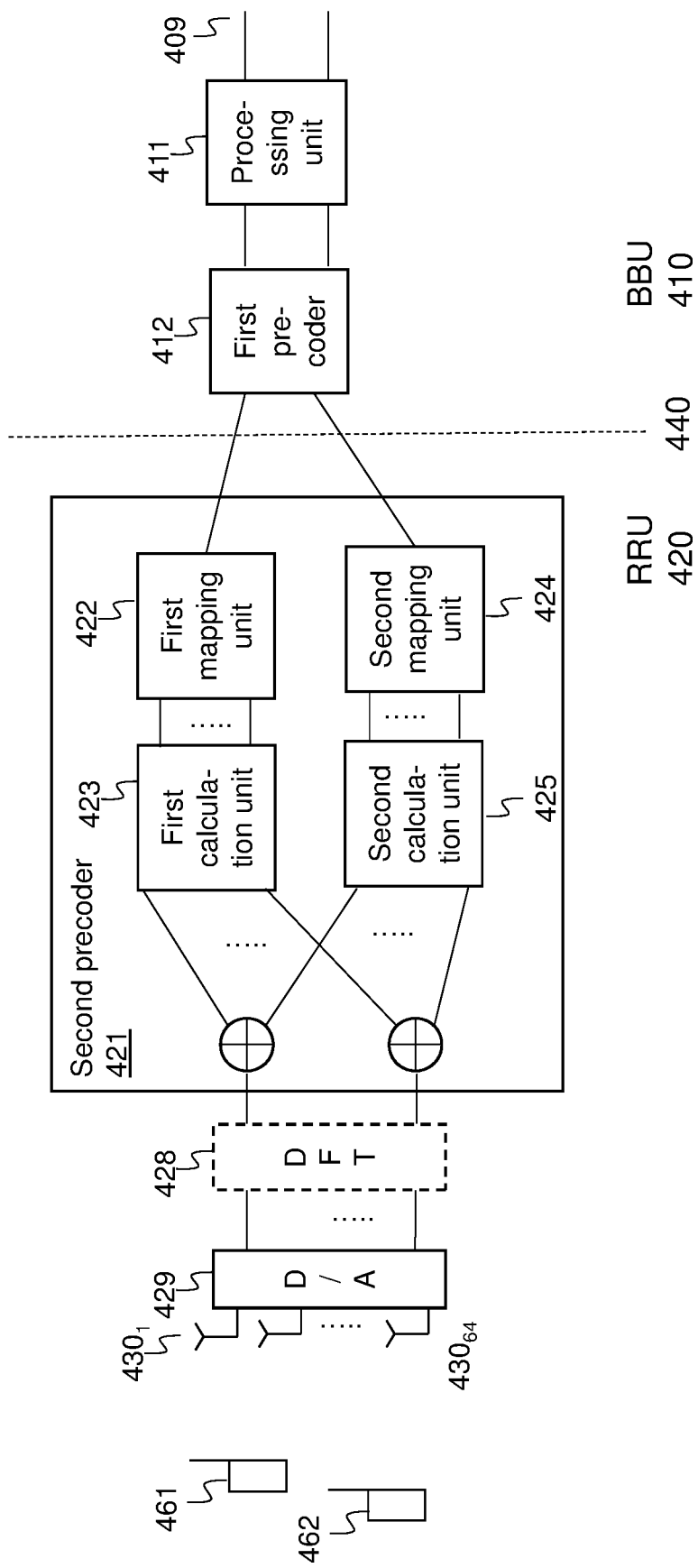
FIG. 5 is a block diagram illustrating a distributed base station system in more detail, according to further possible embodiments.

FIG. 5 shows an exemplary block diagram of an embodiment of a distributed base station system for DL communication when one RRU 420 is connected to one BBU 410. For drawing simplicity reasons, only one RRU is connected to the BBU in this embodiment. However, the base station system can easily be extended to comprise multiple RRUs connected to one BBU. In this example, there are sixty-four antenna elements $430_1 \ldots 430_{64}$ on the distributed base station side and two UEs 461, 462 with one antenna element on each. The processing steps for this embodiment are described below.

The user data in the frequency domain arrives at an input 409 of the BBU 410, from other parts of a wireless communication network, the user data being destined to the two UEs 461, 462. The user data is processed individually in a first processor unit 411 of the BBU 410. The first processing may comprise for example Forward Error Correction (FEC) encoding, mapping into user-layers and modulating. For example, the user data are first coded by a FEC coding and then mapped to user-layers. Then the coded user-layer data are modulated to digital user-layer signals. The BBU further comprises a first precoder 412 for performing a first precoding using first precoding coefficients to pre-compensate for potential interferences between user-layer signals which would take place at the respective UEs 461, 462 if the precoding would not have been performed. This first precoding considers the effective channel, the effective channel including a wireless channel towards the respective UE and processing of the user-layer signals in the RRU, e.g. the second precoding in the RRU. In other words, when determining the first precoding coefficients, the second precoding that is to take place in the RRU is also taken into consideration. In this example, the output of the first precoder 412 is two precoded digital user-layer signals, each of which are intended for one user-layer. The partly precoded digital user-layer signals are then transported over a fronthaul interface 440 to the RRU 420.

The RRU 420 comprises a second precoder 421 that performs a second precoding to the received partly precoded digital user-layer signals. The digital user-layer signals, now precoded by both the first and the second precoder, are then converted from digital to analog domain in a digital-to-analog (D/A) converter 429, and frequency converted from baseband to radio frequency. Thereafter, the final precoded signals, now being analog and at a radio frequency, are transmitted wirelessly towards the UEs, via the sixty-four antennas $430_1 - \ldots - 430_{64}$.

The second precoder 421 precodes each partly precoded digital user-layer signal in order to concentrate the energy of each user-layer signal towards its intended UE. For example, the precoded user-layer signals transmitted from different antennas are then received coherently at the UEs, such that the received energy is enhanced for each user-layer signal. The second precoding coefficients used for the second precoding are calculated based on the measurements of the uplink signals from the UEs performed by the RRU. The measurements of the uplink signal are used to estimate the channel coefficients that define the downlink channel, based on a knowledge of the relation between an uplink channel and a downlink channel for this wireless communication link between the RRU and the respective UE 461, 462. The channel coefficients are then used to determine the second precoder coefficients in order to concentrate the energy of each user-layer signal towards its intended UE. The channel coefficients may be used in a certain domain, e.g. element or direction domain. More details are given below. To simplify the description, a direction domain implementation is assumed here. The element domain implementation would be similar to the direction domain implementation.

More specifically, in the second precoder 421, the first user-layer signal going to the first UE 461 is handled by a first mapping unit 422 and a first calculating unit 423, and the second user-layer signal going to the second UE 462 is handled by a second mapping unit 424 and a second calculating unit 425. In the respective first and second mapping unit 422, 424, the user-layer signal intended to the respective first and second UE 461, 462 is then mapped into R directions out of N possible directions, where R<=N. Basically, each mapping unit 422, 424 selects R directions out of N possible direction and expand the respective user-layer signal onto the R directions. The signals on each selected direction R is then the same user-layer signal, when leaving the mapping unit 422, and the signals on each selected direction R is then the same user-layer signal, when leaving the mapping unit 424. Note that the selection of directions R is usually different for different user layer signals due to the channel differences. The selection of directions R for the respective user-layer signal depends on where the respective UE that is to receive the respective signal is situated, as well as the propagation properties, i.e. channel characteristics. The advantage of doing this direction selection is that it can reduce the complexity for performing the next step of precoding in the RRU with the second part of the coefficients, because the number of applied precoding coefficients for each user-layer is reduced. Also, it can improve the performance when excluding some of the possible directions with large channel estimation errors for certain user-layers. According to an embodiment, for each user-layer, a direction selection is implemented where a) the number of selected spatial directions is larger than or equal to the number of total user-layers; b) the selected directions for each user-layer should contain most of the representative (e.g. strongest or the ones with highest SNR) channel components for that user-layer. Criterion a) guarantees that the matrix of the effective channel including the second precoding in RRU and air channel will be full-rank which guarantees the matrix is invertible and therefore benefits for the precoding in BBU and, while criterion b) make sure to send the signal over the strongest channel components.

Then the mapped signals of each user layer are multiplied, in its respective calculation 423, 425 with the precoding coefficients of the second precoder 421, calculated e.g. as mentioned above. In a certain embodiment, the coefficients of the second precoder are equal to the MRT coefficients for the selected directions, which is to maximize the energy of each user-layer signals received at each UE. Thereafter, for each selected direction, the precoded signals of the all involved user layers (in this case two) are added together and sent to the D/A converter 429. In the direction domain implementation, before the direction domain precoded signals are D/A converter, they are transformed to an antenna element domain by a spatial Discrete Fourier Transformation (DFT) unit 428 so that the signal which each antenna element is to transmit is assorted to its correct antenna element. For example, a 64-point DFT, i.e. Fast Fourier Transformation (FFT) unit, can transfer sixty-four antenna elements to sixty-four directions. In case mapping is performed directly into antenna-element domain, the DFT unit 428 can be abolished.

In the following, there is a theoretical explanation of different steps of an embodiment of the invention. Let H denote a downlink channel estimate matrix in antenna-element domain or direction domain of size K×N, where K<<N. Zero-forcing (ZF) is one well-known precoding scheme, especially it achieves near optimal performance for massive MIMO systems when the interferences from the neighboring cells are not considered. Here, it is used to derive the method according to embodiments of the invention, showing that the invention achieves the same performance as ZF precoding even though it is done by two parts of precoding coefficients in BBU and RRU. Basically, the ZF precoding is to completely pre-cancel the interferences between user-layers. In an ideal case assuming perfect channel information, with the ZF precoding, the receivers at the UEs receives the interference-free user-layer signals.

The ZF precoding coefficients can be calculated as the pseudo inverse of the DL channel estimate matrix. The pseudo inverse of a rectangular channel matrix H can be expressed as $$H^+ = H^*(HH^*)^{-1}$$

where H* denotes the Hermitian transpose of the matrix H. Following the ZF formulation, the signals to transmit wirelessly from the antennas after precoding can be expressed as $$x_b = H^+ x = H^*((HH^*)^{-1}x) = H^* x_p$$

Where $x_p = (HH^*)^{-1} x$ is the input signal precoded with the first part of coefficients, i.e. in the BBU. The transmit signal $x_b$ can be viewed as composed in two steps.

The H* conducts MRT operation regarding channel H. And the term $(HH^*)^{-1}$ acts as the ZF precoding of the effective channel HH* covering both the air channel H and the MRT operation H*. The original user-layer signal x, at the input to the first precoder is a K-dimension vector. The precoded signal $x_p$ is also K-dimension, which is transported over the fronthaul links. Then the precoded signal $x_p$ received at the RRU is mapped on the N antenna-elements/directions to be $x_b$ via the MRT matrix H*. This justifies the invention from the theoretical point of view that it achieves the same performance as the case where the precoding is only implemented in BBU as in functional split option 7-1. Note that other pre-cancellation techniques like Minimum Mean Square Error (MMSE) is still applicable in this way. Note that the signal mapping can be done in a selective way by selecting R elements/directions to map, as described previously.

According to another embodiment, for the downlink direction, the BBU is connected to a RRU equipped with N antennas, for example in a Uniform Linear Array (ULA), which is communicating with K single-antenna UEs. The channel estimation in RRU is performed in direction domain. The data symbols destined for each user-layer compose a K-dimension input signal x in BBU. The BBU has access to the estimation of the effective downlink channel $H_b = HH^*$ seen from its FH interface. It means that $H_t$ covers the second precoding conducted in the RRU and the downlink air channel. BBU pre-mitigates the signal for interference between the two UEs via ZF precoding as $$x_p = H_b^{-1} x$$

where the operations in the RRU is implemented such that $H_b$ is a full-rank K×K matrix.

In the RRU, the second precoding is carried out to map $x_p$ onto the N directions/antennal-elements as $$x_b = B x_p$$

where B denotes the beamforming coefficients of the second precoding performed in the RRU based on the estimated downlink channel in a certain domain, e.g., antenna-element domain or direction domain. If the signal is now in the direction domain, an additional step is taken to transform it to the antenna-element domain. In this work, we implement a spatial DFT to visualize the air channel on N fixed azimuth directions for the ULA example. In this case, the transmit signal becomes $$x_e = F x_b$$

where F denotes the normalized N×N DFT matrix. After passing through the air channel H, the receive signal at the user side can be expressed as $$y = Hx_b + n = H \underbrace{FB}_{\text{RRU operation}} \underbrace{H_b^{-1} x}_{\text{BBU operation}} + n$$

Ideally, we have the estimation $H_b$=HFB in BBU where $H_b$ is defined as the effective channel covering the air channel and the precoding including the spatial DFT in RRU. And for the MRT precoding in RRU, B=(HF)* where HF is defined as the channel in direction domain, e.g. using a DFT. The example above shows an element domain implementation for the second precoder in the RRU, but based on the direction domain channel estimation. In this case, there is no need for an explicit spatial DFT module in the hardware design. Instead, the second precoding coefficients are calculated as B=(HF)* in which the DFT is implicitly included.

Consider the scenario as depicted in FIG. 2, where two RRUs 120, 130 are connected to the same BBU 110 and both RRUs communicate with K UEs, (in the example of FIG. 2, K=3). Each of the RRUs is equipped with N antennas (in FIG. 2, N=3). The air channel perceived by RRU1 and RRU2 are denoted as $H_{RRU1}$ and $H_{RRU2}$, respectively, where both are K×N matrices. In the BBU, the precoded signal $x_p$ as formulated above is generated. In the two-RRU case, the $H_b$ contains the information of the second precoding conducted in both RRU1 and RRU2, as well as their respectively perceived channel $H_{RRU1}$ and $H_{RRU2}$. Thereby, the coordinated processing at the BBU is achieved regarding multiple RRUs. The $x_p$ is then transported to both RRUs 120, 130 over the connecting fronthaul links. For example, the BBU can multicast the precoded user-layer signals $x_p$ to multiple RRUs involved.

In each RRU, the second precoding is carried out according to its perceived channel to map $x_p$ onto the N directions/antenna-elements of the RRU. The beamforming-coefficient matrices implemented in each RRU in this example are denoted as $B_{RRU1}$ and $B_{RRU2}$, respectively. When MRT precoding is performed in each RRU, $B_{RRU1}=(H_{RR*J1}F)^*$ and $B_{RRU2}=(H_{RRU2}F)^*$. For theoretical analysis, assuming the ideal estimation in BBU:

$$H_b = [H_{RRU1} \quad H_{RRU2}] \begin{bmatrix} FB_{RRU1} \\ FB_{RRU2} \end{bmatrix}.$$

The received signal at the user side is $y=y_{RRU1}+y_{RRU2}$, where $$y_{RRU1} = H_{RRU1} \underbrace{FB_{RRU1}}_{\text{RRU1 operation}} \underbrace{H_b^{-1} x}_{\text{BBU operation}} + n_1$$

$$y_{RRU2} = H_{RRU2} \underbrace{FB_{RRU2}}_{\text{RRU2 operation}} \underbrace{H_b^{-1} x}_{\text{BBU operation}} + n_2$$

This formulation is equivalent to having a single RRU equipped with 2N antennas. Therefore, this example shows that the method scales up the MIMO system fully two times by having two RRUs. The same procedure is applicable to more than two RRUs.

Figure 6:
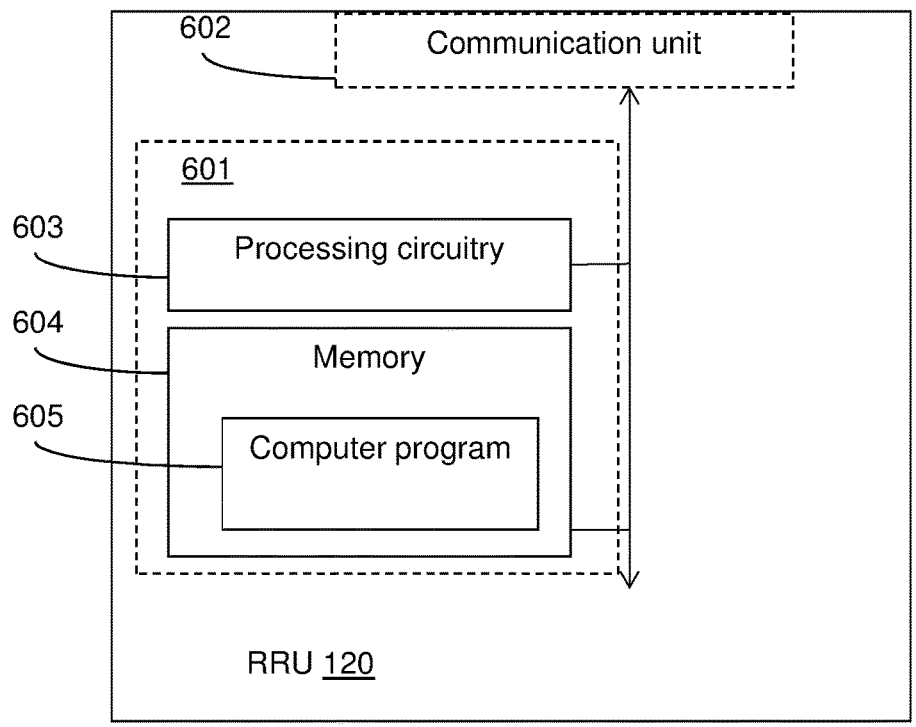
FIGS. 6-7 are block diagrams illustrating an RRU in more detail, according to further possible embodiments.

FIG. 6, in conjunction with FIG. 2, shows an RRU 120 operable in a distributed base station system 100 of a wireless communication network. The distributed base station system 100 further comprises a BBU 110 connected to the RRU. The RRU 120 is connected to a plurality of antennas 121, 122, 123 through which the RRU is arranged to transmit user-layer signals to a plurality of UEs 161, 162, 163 using same time-frequency resource. The RRU 120 comprises a processing circuitry 603 and a memory 604. The memory contains instructions executable by said processing circuitry, whereby the RRU 120 is operative for receiving uplink signals from the plurality of UEs, sending information related to the received uplink signals to the BBU so that the BBU can obtain a first part of precoding coefficients to be used for precoding digital user-layer signals in frequency domain, and obtaining a second part of the precoding coefficients. The RRU 120 is further operative for receiving, from the BBU, the digital user-layer signals precoded using the first part of the precoding coefficients, and precoding the received digital user-layer signals with the second part of the precoding coefficients. The RRU 120 is further operative for converting the digital user-layer signals precoded with the first and the second part of the precoding coefficients to analog user-layer signals, and transmitting the analog user-layer signals to the plurality of UEs 161, 162, 163 via the plurality of antennas 121, 122, 123.

According to an embodiment, the obtained second part of the precoding coefficients is arranged to be determined so that when the analog user-layer signals are transmitted, the transmitted energy of each user-layer signal is spatially concentrated towards its corresponding UE 161, 162, 163. The RRU may be configured to determine the second part of the precoding coefficients, or alternatively the RRU may be configured to receive the precoding coefficient from the BBU, wherein the BBU is configured to determine the second part of the precoding coefficients.

According to another embodiment, the second part of the precoding coefficients is arranged to be determined by determining MRT coefficients for each user-layer signal based on the uplink signals.

According to another embodiment, the RRU 120 is further operative for selecting, based on the received uplink signals and per digital user-layer signal, a number of spatial directions out of a larger number of possible spatial directions, the selected number of spatial directions being fewer than the plurality of antennas but larger than or equal to the number of digital user-layer signals. Further, the RRU is operative for precoding the received digital user-layer signals for the selected number of spatial directions. According to a variant of this embodiment, the selected number of spatial directions have higher channel gain or better signal quality according to the received uplink signals than non-selected spatial directions of the possible spatial directions.

According to other embodiments, the RRU 120 may further comprise a communication unit 602, which may be considered to comprise conventional means for communication with the BBU 110 over the fronthaul link 140 and for wireless communication with the UEs 161-163, such as a wireless transceiver. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the RRU 120 to perform the steps described in any of the described embodiments of the RRU 120. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the wireless communication network 100 to which the RRU 120 has access via the communication unit 602. The computer program 605 may then be downloaded from the server into the memory 604.

Figure 7:
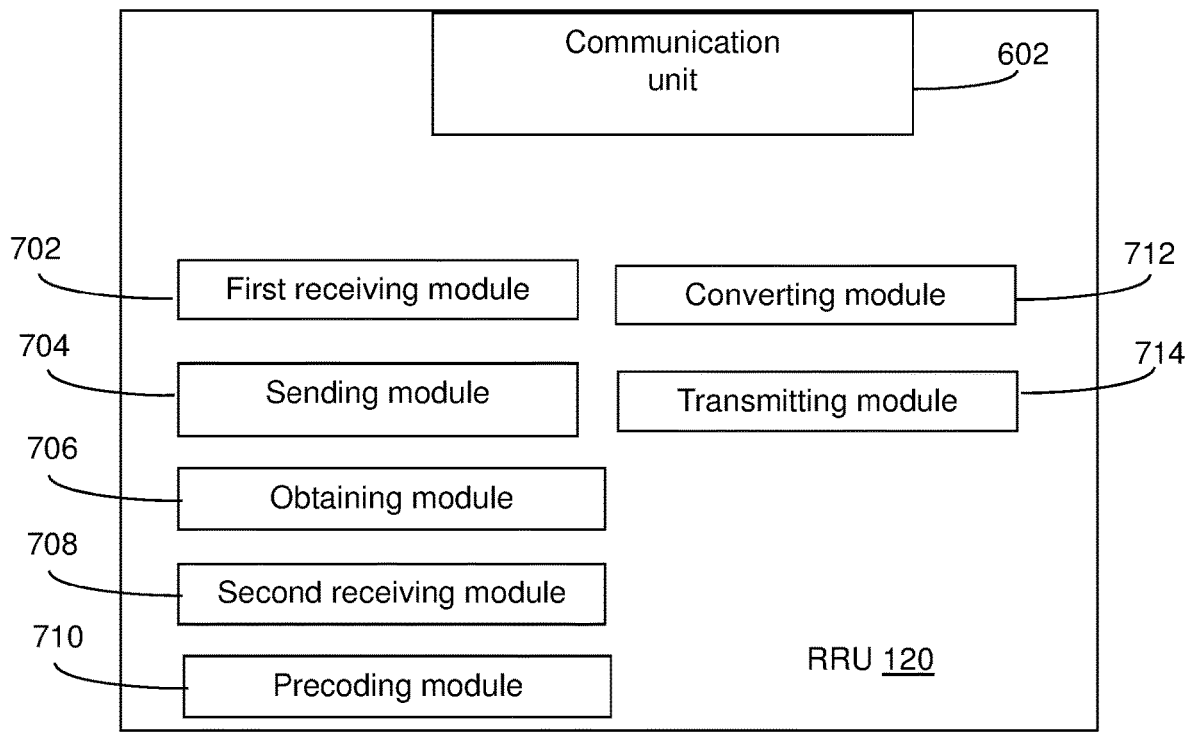

FIG. 7, in conjunction with FIG. 2, shows another embodiment of a RRU 120, the RRU 120 being operable in a distributed base station system 100 of a wireless communication network. The distributed base station system 100 further comprising a BBU 110 connected to the RRU. The RRU 120 is further connected to a plurality of antennas 121, 122, 123 through which the RRU is arranged to transmit user-layer signals to a plurality of UEs 161, 162, 163, using same time-frequency resource. The RRU 120 comprises a first receiving module 702 for receiving uplink signals from the plurality of UEs, and a sending module 704 for sending information related to the received uplink signals to the BBU so that the BBU can obtain a first part of precoding coefficients to be used for precoding digital user-layer signals in frequency domain. The RRU 120 further comprises an obtaining module 706 for obtaining a second part of the precoding coefficients, a second receiving module 708 for receiving, from the BBU, the digital user-layer signals precoded using the first part of the precoding coefficients, and a precoding module 710 for precoding the received digital user-layer signals with the second part of the precoding coefficients. The RRU 120 further comprises a converting module 712 for converting the digital user-layer signals precoded with the first and the second part of the precoding coefficients to analog user-layer signals, and a transmitting module 714 for transmitting the analog user-layer signals to the plurality of UEs 161, 162, 163 via the plurality of antennas 121, 122, 123. The RRU 120 may further comprise a communication unit 602 similar to the communication unit described in FIG. 6. In an embodiment, the modules of FIG. 7 are implemented as a computer program running on a processing circuitry, such as the processing circuitry 603 shown in FIG. 6.

Figure 8:
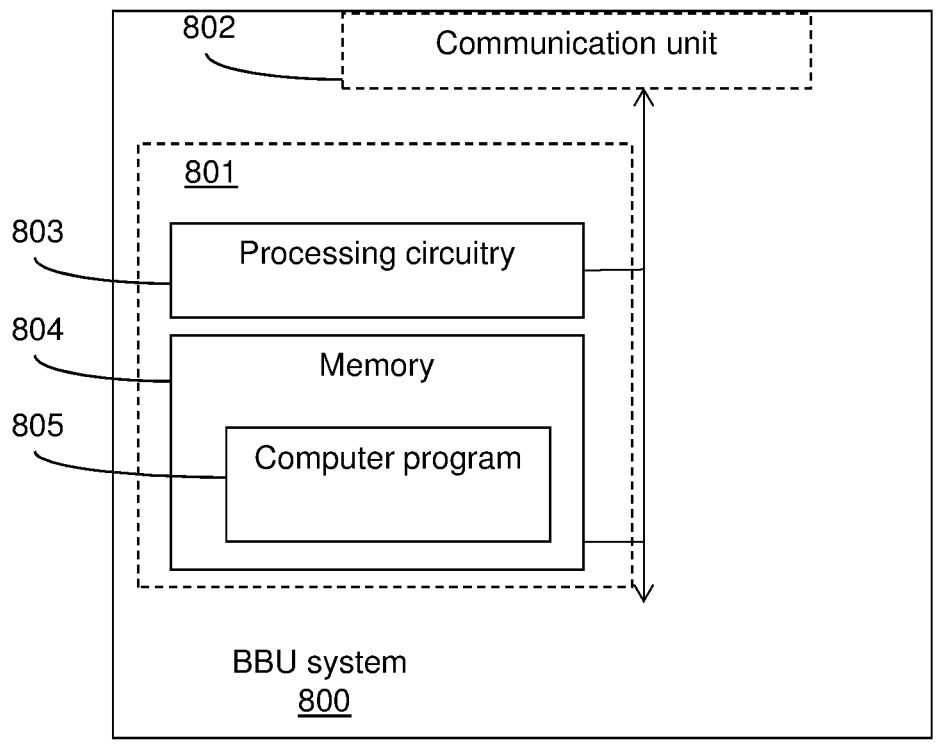
FIGS. 8-9 are block diagrams illustrating a BBU system in more detail, according to further possible embodiments.

FIG. 8, in conjunction with FIG. 2, shows a BBU system 800 operable in a wireless communication network, the wireless communication network comprising a distributed base station system 100 having a BBU 110 and at least one RRU 120, 130 connected to the BBU 110. The BBU system 800 comprises a processing circuitry 803 and a memory 804. The memory contains instructions executable by said processing circuitry, whereby the BBU system 800 is operative for receiving, from the at least one RRU 120, 130, information related to uplink signals received by the at least one RRU from a plurality of UEs 161, 162, 163 wirelessly connected to the at least one RRU 120, 130. The BBU system 800 is further operative for obtaining, based on the received information, a first part of precoding coefficients for precoding digital user-layer signals, which precoded user-layer signals are to be sent by the at least one RRU 120, 130 to the plurality of UEs 161, 162, 163, the first part of the precoding coefficients being determined so as to pre-mitigate interference between the user layer signals sent to the plurality of UEs, the precoding coefficients comprising the first part and a second part. The BBU system 800 is further operative for precoding the digital user-layer signals, using only the first part of the precoding coefficients, and for sending the precoded digital user-layer signals to the at least one RRU for further precoding with the second part of the precoding coefficients before the user-layer signals are sent to the UEs 161, 162, 163.

The BBU system 800 that performs the method may be arranged in the BBU 110, in fact, it may be the BBU 110. Alternatively, the BBU system may be any other network node of the communication network, such as a node further away from the UE, e.g. another network element in the RAN or close to the RAN or another RAN node. In this alternative, the BBU 110 receives from the RRU 120, the information related to uplink signals received by the RRU 120 from the UEs, and communicates the information to the other network node for performing the determination 404, where after the other network node sends the determined second part of precoding coefficients back to the BBU 110 for further distribution to the RRU 120. Alternatively, the BBU system may be a group of network nodes, wherein functionality for performing the method are spread out over different physical, or virtual, nodes of the network. The latter may be called a "cloud-solution"

According to an embodiment, the BBU system 800 is further operative for determining, based on the received information, the second part of the precoding coefficients, and for sending the determined second part of the precoding coefficients to the at least one RRU.

According to another embodiment, the at least one RRU 120, 130 comprises a first RRU 120 and a second RRU 130. For at least one of the plurality of UEs 161, 162, 163, the BBU system 800 is operative for sending the precoded digital user-layer signal of that UE to the first RRU 120 as well as to the second RRU 130.

According to other embodiments, the BBU system 800 may further comprise a communication unit 802, which may be considered to comprise conventional means for communication with the RRU 120, and with the BBU 110, in case the BBU system 800 in arranged somewhere else than in the actual BBU 110. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the BBU system 800 to perform the steps described in any of the described embodiments of the BBU system 800. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity connected to the wireless communication network 100 to which the BBU system 800 has access via the communication unit 802. The computer program 805 may then be downloaded from the server into the memory 804.

Figure 9:
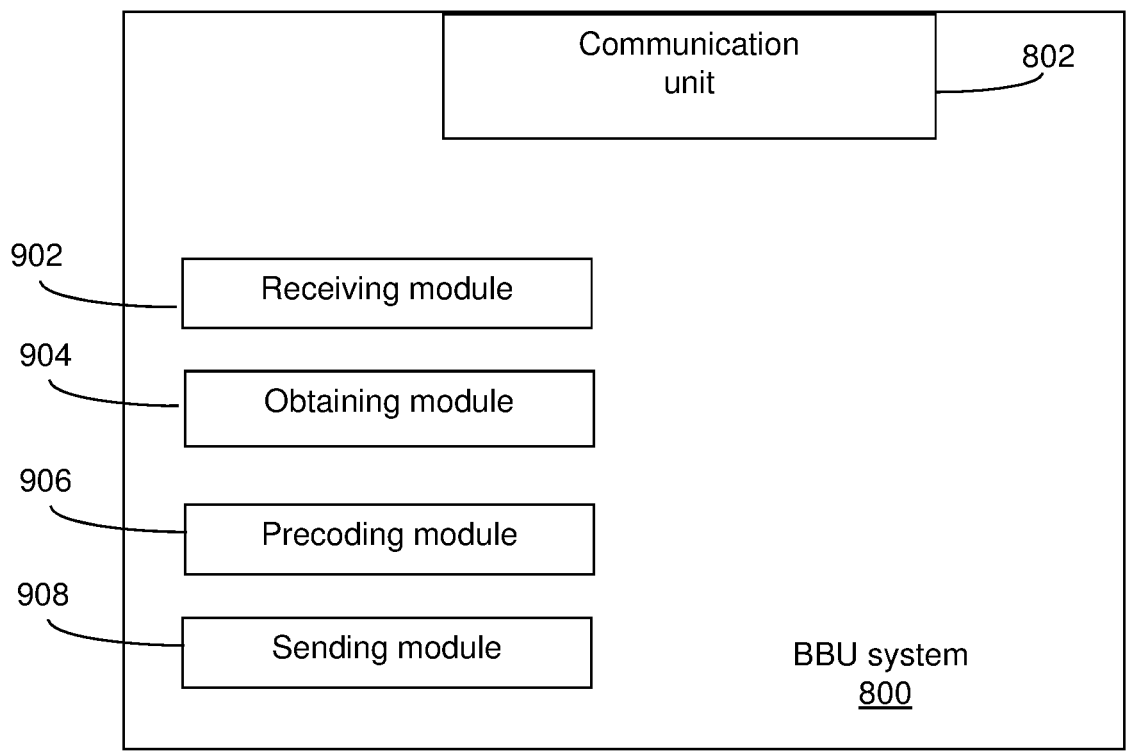

FIG. 9, in conjunction with FIG. 2, describes an alternative embodiment of a BBU system 800 operable in a wireless communication network, the wireless communication network comprising a distributed base station system 100 having a BBU 110 and at least one RRU 120, 130 connected to the BBU 110. The BBU system 800 comprises a receiving module 902 for receiving, from the at least one RRU 120, 130, information related to uplink signals received by the at least one RRU from a plurality of UEs 161, 162, 163 wirelessly connected to the at least one RRU 120, 130. The BBU system 800 further comprises an obtaining module 904 for obtaining, based on the received information, a first part of precoding coefficients for precoding digital user-layer signals, which precoded user-layer signals are to be sent by the at least one RRU 120, 130 to the plurality of UEs 161, 162, 163, the first part of the precoding coefficients being determined so as to pre-mitigate interference between the user layer signals sent to the plurality of UEs, the precoding coefficients comprising the first part and a second part. The BBU system 800 further comprises a precoding module 906 for precoding the digital user-layer signals, using only the first part of the precoding coefficients, and a sending module 908 for sending the precoded digital user-layer signals to the at least one RRU for further precoding with the second part of the precoding coefficients before the user-layer signals are sent to the UEs 161, 162, 163. The BBU system 800 may further comprise a communication unit 602 similar to the communication unit described in FIG. 8. In an embodiment, the modules of FIG. 9 are implemented as a computer program running on a processing circuitry, such as the processing circuitry 803 shown in FIG. 8.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a remote radio unit, RRU, of a distributed base station system of a wireless communication network, the distributed base station system further comprising a base band unit, BBU, connected to the RRU, the RRU being connected to a plurality of antennas through which the RRU transmits user-layer signals to a plurality of UEs, the user-layer signals being transmitted using same time-frequency resource, the method comprising:
    receiving uplink signals from the plurality of UEs;
    sending information related to the received uplink signals to the BBU so that the BBU can obtain a first part of precoding coefficients to be used for precoding digital user-layer signals in frequency domain;
    obtaining a second part of the precoding coefficients;
    receiving, from the BBU, the digital user-layer signals precoded using the first part of the precoding coefficients,
    precoding the received digital user-layer signals with the second part of the precoding coefficients,
    converting the digital user-layer signals precoded with the first and the second part of the precoding coefficients to analog user-layer signals, and
    transmitting the analog user-layer signals to the plurality of UEs via the plurality of antennas,
    wherein the obtained second part of the precoding coefficients is determined so that when transmitting the analog user-layer signals, the transmitted energy of each user-layer signal is spatially concentrated towards its corresponding UE.

2. Method according to claim 1, wherein the second part of the precoding coefficients is determined by determining maximum ratio transmission, MRT, coefficients for each user-layer signal based on the uplink signals.

3. Method according to claim 1, further comprising:
    selecting, based on the received uplink signals and per digital user-layer signal, a number of spatial directions out of a larger number of possible spatial directions, the selected number of spatial directions being fewer than the plurality of antennas but larger than or equal to the number of digital user-layer signals, and wherein the precoding is performed for the selected number of spatial directions.

4. Method according to claim 3, wherein the selected number of spatial directions have higher channel gain or better signal quality according to the received uplink signals than non-selected spatial directions of the possible spatial directions.

5. A method performed by a base band unit, BBU, system of a wireless communication network, the wireless communication network comprising a distributed base station system having a BBU and at least one remote radio unit, RRU, connected to the BBU, the method comprising:
    receiving, from the at least one RRU, information related to uplink signals received by the at least one RRU from a plurality of UEs wirelessly connected to the at least one RRU;
    obtaining, based on the received information, a first part of precoding coefficients for precoding digital user-layer signals, which precoded user-layer signals are to be sent by the at least one RRU to the plurality of UEs, the first part of the precoding coefficients being determined so as to pre-mitigate interference between the user layer signals sent to the plurality of UEs, the precoding coefficients comprising the first part and a second part;
    precoding the digital user-layer signals, using only the first part of the precoding coefficients, and
    sending the precoded digital user-layer signals to the at least one RRU for further precoding with the second part of the precoding coefficients before the user-layer signals are sent to the UEs,
wherein the second part of the precoding coefficients is determined so that when transmitting analog user-layer signals by the at least one RRU, the transmitted enemy of each user-layer signal is spatially concentrated towards its corresponding UE.

6. Method according to claim 5, further comprising:
determining, based on the received information, the second part of the precoding coefficients, and
sending the determined second part of the precoding coefficients to the at least one RRU.

7. Method according to claim 5, wherein the at least one RRU comprises a first RRU and a second RRU, wherein for at least one of the plurality of UEs, the precoded digital user-layer signal of that UE is sent to the first RRU as well as to the second RRU.

8. A remote radio unit, RRU, operable in a distributed base station system of a wireless communication network, the distributed base station system further comprising a base band unit, BBU, connected to the RRU, the RRU being connected to a plurality of antennas through which the RRU is arranged to transmit user-layer signals to a plurality of UEs, using same time-frequency resource, the RRU comprising a processing circuitry and a memory, said memory containing instructions executable by said processing circuitry, whereby the RRU is operative for:
receiving uplink signals from the plurality of UEs;
sending information related to the received uplink signals to the BBU so that the BBU can obtain a first part of precoding coefficients to be used for precoding digital user-layer signals in frequency domain;
obtaining a second part of the precoding coefficients;
receiving, from the BBU, the digital user-layer signals precoded using the first part of the precoding coefficients,
precoding the received digital user-layer signals with the second part of the precoding coefficients,
converting the digital user-layer signals precoded with the first and the second part of the precoding coefficients to analog user-layer signals, and
transmitting the analog user-layer signals to the plurality of UEs via the plurality of antennas,
wherein the obtained second part of the precoding coefficients is determined so that when transmitting the analog user-layer signals, the transmitted energy of each user-layer signal is spatially concentrated towards its corresponding UE.

9. RRU according to claim 8, wherein
the RRU may be configured to determine the second part of the precoding coefficients, or alternatively the RRU may be configured to receive the precoding coefficient from the BBU, wherein the BBU is configured to determine the second part of the precoding coefficients.

10. RRU according to claim 8, wherein the second part of the precoding coefficients is arranged to be determined by determining maximum ratio transmission, MRT, coefficients for each user-layer signal based on the uplink signals.

11. RRU according to claim 8, further being operative for selecting, based on the received uplink signals and per digital user-layer signal, a number of spatial directions out of a larger number of possible spatial directions, the selected number of spatial directions being fewer than the plurality of antennas but larger than or equal to the number of digital user-layer signals, and the RRU being operative for precoding the received digital user-layer signals for the selected number of spatial directions.

12. RRU according to claim 11, wherein the selected number of spatial directions have higher channel gain or better signal quality according to the received uplink signals than non-selected spatial directions of the possible spatial directions.

13. A base band unit, BBU, system operable in a wireless communication network, the wireless communication network comprising a distributed base station system having a BBU and at least one remote radio unit, RRU, connected to the BBU, the BBU system comprising a processing circuitry and a memory, said memory containing instructions executable by said processing circuitry, whereby the BBU system is operative for:
receiving, from the at least one RRU, information related to uplink signals received by the at least one RRU from a plurality of UEs wirelessly connected to the at least one RRU;
obtaining, based on the received information, a first part of precoding coefficients for precoding digital user-layer signals, which precoded user-layer signals are to be sent by the at least one RRU to the plurality of UEs, the first part of the precoding coefficients being determined so as to pre-mitigate interference between the user layer signals sent to the plurality of UEs, the precoding coefficients comprising the first part and a second part;
precoding the digital user-layer signals, using only the first part of the precoding coefficients, and
sending the precoded digital user-layer signals to the at least one RRU for further precoding with the second part of the precoding coefficients before the user-layer signals are sent to the UEs,
wherein the second part of the precoding coefficients is determined so that when transmitting analog user-layer signals by the at least one RRU, the transmitted energy of each user-layer signal is spatially concentrated towards its corresponding UE.

14. BBU system according to claim 13, further being operative for determining, based on the received information, the second part of the precoding coefficients, and sending the determined second part of the precoding coefficients to the at least one RRU.

15. BBU system according to claim 13, wherein the at least one RRU comprises a first RRU and a second RRU, wherein for at least one of the plurality of UEs, the BBU system is operative for sending the precoded digital user-layer signal of that UE to the first RRU as well as to the second RRU.

16. A computer readable non-transitory storage medium storing a computer program, which, when executed by at least one processing circuitry of a remote radio unit, RRU, of a distributed base station system that further comprises a base band unit, BBU, connected to the RRU, and where the RRU is connected to a plurality of antennas through which the RRU is arranged to transmit user-layer signals to a plurality of UEs, using same time-frequency resource, causes the RRU to perform the following steps:
receiving uplink signals from the plurality of UEs;
sending information related to the received uplink signals to the BBU so that the BBU can obtain a first part of precoding coefficients to be used for precoding digital user-layer signals in frequency domain;
obtaining a second part of the precoding coefficients;
receiving, from the BBU, the digital user-layer signals precoded using the first part of the precoding coefficients, precoding the received digital user-layer signals with the second part of the precoding coefficients, converting the digital user-layer signals precoded with the first and the second part of the precoding coefficients to analog user-layer signals, and transmitting the analog user-layer signals to the plurality of UEs via the plurality of antennas, wherein the obtained second part of the precoding coefficients is determined so that when transmitting the analog user-layer signals, the transmitted energy of each user-layer signal is spatially concentrated towards its corresponding UE.

17. A computer readable non-transitory storage medium storing a computer program, which, when executed by at least one processing circuitry of a base band unit, BBU, system of a wireless communication network comprising a distributed base station system having a BBU and at least one remote radio unit, RRU, connected to the BBU, causes the BBU system to perform the following steps:

receiving, from the at least one RRU, information related to uplink signals received by the at least one RRU from a plurality of UEs wirelessly connected to the at least one RRU;

obtaining, based on the received information, a first part of precoding coefficients for precoding digital user-layer signals, which precoded user-layer signals are to be sent by the at least one RRU to the plurality of UEs, the first part of the precoding coefficients being determined so as to pre-mitigate interference between the user layer signals sent to the plurality of UEs, the precoding coefficients comprising the first part and a second part;

precoding the digital user-layer signals, using only the first part of the precoding coefficients, and sending the precoded digital user-layer signals to the at least one RRU for further precoding with the second part of the precoding coefficients before the user-layer signals are sent to the UEs, wherein the second part of the precoding coefficients is determined so that when transmitting analog user-layer signals by the at least one RRU, the transmitted energy of each user-layer signal is spatially concentrated towards its corresponding UE.

* * * * *

UNITED STATES PATENT AND TRADEMARK OFFICE
CERTIFICATE OF CORRECTION

PATENT NO. : 11,419,105 B2
APPLICATION NO. : 16/769504
DATED : August 16, 2022
INVENTOR(S) : Lu et al.

It is certified that error appears in the above-identified patent and that said Letters Patent is hereby corrected as shown below:

In the Drawings

In Fig. 3, Sheet 2 of 6, and on the title page, the illustrative figure, for Tag "209", in Line 1, delete "nr" and insert -- no. --, therefor.

In Fig. 3, Sheet 2 of 6, and on the title page, the illustrative figure, for Tag "209", in Line 2, delete "nr" and insert -- no. --, therefor.

In the Specification

In Column 1, Line 13, delete "COMMUNICATION" and insert -- COMMUNICATION" --, therefor.

In Column 4, Line 60, delete "RRU, the" and insert -- RRU. The --, therefor.

In Column 7, Line 17, delete "first and second RRU 120" and insert -- first and second RRU 120, 130 --, therefor.

In Column 9, Line 67, delete "digital Fourier transform, DFT," and insert -- Discrete Fourier Transform, DFT, --, therefor.

In Column 10, Line 3, delete "as describes" and insert -- as described --, therefor.

In Column 11, Line 55, delete "on order" and insert -- in order --, therefor.

In Column 11, Line 56, delete "form" and insert -- from --, therefor.

In Column 14, Line 42, delete "$H_t$" and insert -- $H_b$ --, therefor.

In Column 14, Line 66, delete "receive" and insert -- received --, therefor.

Signed and Sealed this
Seventh Day of February, 2023

Katherine Kelly Vidal
*Director of the United States Patent and Trademark Office*

CERTIFICATE OF CORRECTION (continued)
U.S. Pat. No. 11,419,105 B2

In Column 15, Line 1, delete "$y = Hx_b + n = H \underbrace{FB}_{RRU\ operation} \underbrace{H_b^{-1}x}_{BBU\ operation} + n$" and insert -- $y = Hx_e + n = H \underbrace{FB}_{RRU\ operation} \underbrace{H_b^{-1}x}_{BBU\ operation} + n$ --, therefor.

In Column 15, Line 39, delete "$B_{RRU1}=(H_{RR*J1}\ F)^*$" and insert -- $B_{RRU1}=(H_{RRU1}\ F)^*$ --, therefor.

In Column 17, Lines 16-17, delete "wireless communication network 100" and insert -- wireless communication network --, therefor.

In Column 18, Line 29, delete ""cloud-solution"" and insert -- "cloud-solution". --, therefor.

In Column 18, Line 45, delete "in arranged" and insert -- is arranged --, therefor.

In Column 19, Line 8, delete "wireless communication network 100" and insert -- wireless communication network --, therefor.

In the Claims

In Column 20, Lines 14-15, in Claim 1, delete "coefficients," and insert -- coefficients; --, therefor.

In Column 20, Line 17, in Claim 1, delete "coefficients," and insert -- coefficients; --, therefor.

In Column 20, Line 20, in Claim 1, delete "signals, and" and insert -- signals; and --, therefor.

In Column 20, Line 65, in Claim 5, delete "coefficients, and" and insert -- coefficients; and --, therefor.

In Column 21, Line 5, in Claim 5, delete "enemy" and insert -- energy --, therefor.

In Column 21, Lines 35-36, in Claim 8, delete "coefficients," and insert -- coefficients; --, therefor.

In Column 21, Line 38, in Claim 8, delete "coefficients," and insert -- coefficients; --, therefor.

In Column 21, Line 41, in Claim 8, delete "signals, and" and insert -- signals; and --, therefor.

In Column 22, Line 29, in Claim 13, delete "coefficients, and" and insert -- coefficients; and --, therefor.

In Column 22, Lines 66-67, in Claim 16, delete "coefficients," and insert -- coefficients; --, therefor.

In Column 23, Line 2, in Claim 16, delete "coefficients," and insert -- coefficients; --, therefor.

In Column 23, Line 5, in Claim 16, delete "signals, and" and insert -- signals; and --, therefor.

In Column 24, Line 11, in Claim 17, delete "coefficients, and" and insert -- coefficients; and --, therefor.